J. M. JONES.
Combined Flour-Chests and Bread-Tables.
No. 148,067.  Patented March 3, 1874.
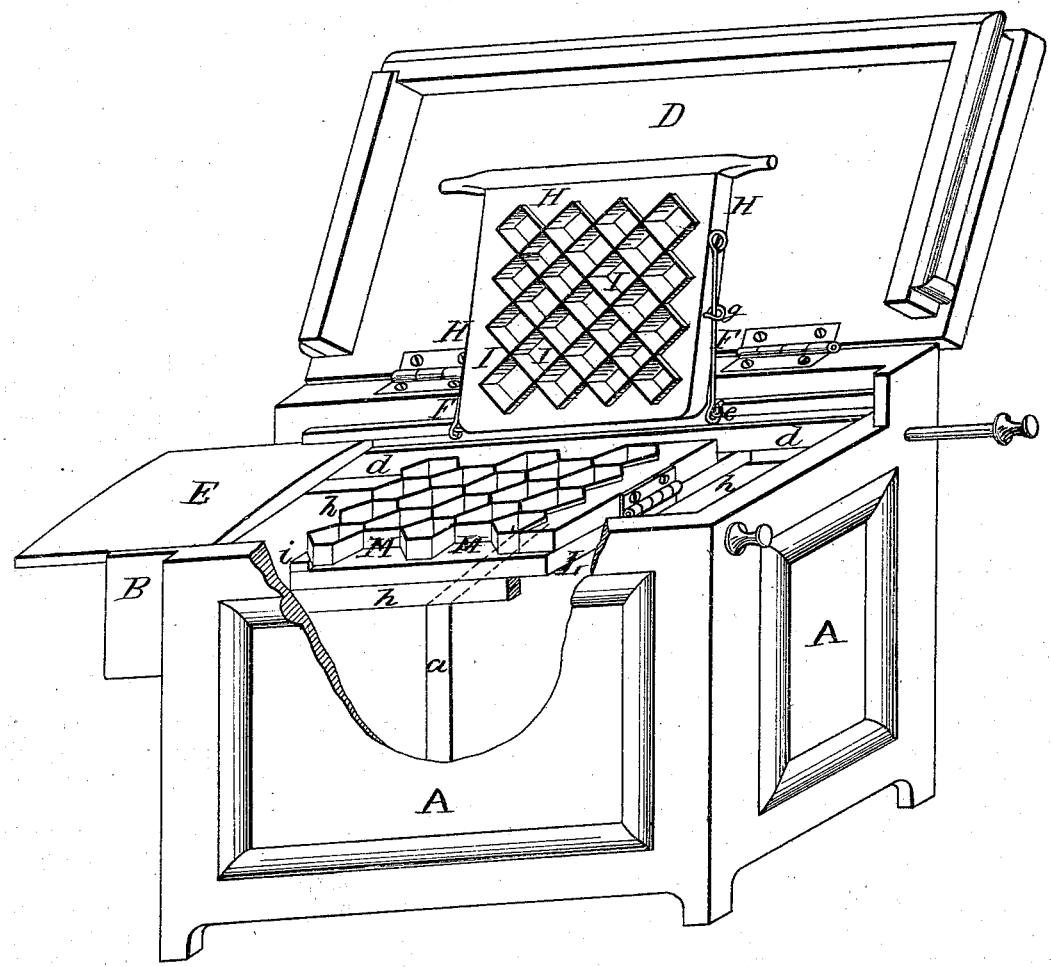

UNITED STATES PATENT OFFICE.

JAMES M. JONES, OF LAWRENCE, KANSAS.

IMPROVEMENT IN COMBINED FLOUR-CHESTS AND BREAD-TABLES.

Specification forming part of Letters Patent No. 148,067, dated March 3, 1874; application filed January 3, 1874.

*To all whom it may concern:*

Be it known that I, JAMES M. JONES, of Lawrence, Kansas, have invented certain new and useful Improvements in Combined Flour-Chest and Bread-Tables, of which the following is a specification, reference being had to the accompanying drawings.

The invention relates to an improved combined flour or meal chest and bread-table; and consists of a chest having compartments to receive various kinds of meal or flour, in the upper part of which is provided a slide, on which is placed a convex unwearable kneading-board, above which a cutter is attached to the chest by a spring-hinge. The cutter consists of a lattice-work of requisite thickness, and having its apertures of any desired shape. Below the said slide another is provided, upon which moves a second kneading-board, having a latticed cutter hinged to it on one edge, and opposite a cleat, to prevent the cutter coming in contact with the board. The end of the chest is provided with a trough to contain any culinary matters, and also having an aperture properly screened to afford ventilation to the chest. The object of the invention is to provide a convenient device for containing flour and similar articles, combined with suitable means for preparing biscuits, cakes, and similar forms of bread for baking.

The accompanying drawing is a perspective view of a device embodying the elements of the invention, certain parts being broken out to disclose the internal arrangement.

A in the accompanying drawing is a chest of usual construction, and divided, in the present instance, into compartments by the partition *a*. It is provided at one side with the trough B, affording a convenient receptacle, and having ventilating aperture *b* (not shown) at one end. The chest is provided with a lid, D, having raised edges to prevent it coming in contact with the devices hereinafter mentioned. The upper inside parts of the sides of the chest are provided with the slide *d*, upon which is placed the unwearable kneading-board E, which is made slightly convex. To the side of the chest are secured the eye-screws *e*, in which are hooked the eyes of the spring hinge-rod F, passing along the side of the cutter-frame, through the eye-screws *g*, and firmly secured to the frame at the other end. This arrangement serves to hinge the frame A to the side of the chest. In the frame H is firmly secured a lattice-work cutter, I, which consists of metal or other durable material. Below the slide *d* is provided a second slide, *h*, upon which is placed the unwearable kneading-board L, to which is hinged the lattice-work cutter M, having its upper edges sharpened, and the board L being provided, opposite the place where the cutter is hinged, with the cleat *i*, to prevent the cutter M coming in contact with the board L.

The dough being rolled out upon the board E, the cutter I is brought down, whereby the dough is properly cut into the desired shapes, the spring hinge-rod F permitting it to act over the convex surface of the board. In using the lower device, the dough is first rolled, then placed upon the cutter M, when a rolling-pin is passed over the dough, forcing the cutter through it, and depositing the same, cut into desired shapes, upon the board below. When, during the operation of preparing the dough, it is desired to leave access to the contents of either compartment of the chest, it is only necessary to slide the board or boards to the opposite side.

What I claim as my invention, and desire to secure by Letters Patent, is—

1. The latticed cutter I, provided with the spring hinge-rod F, in combination with the curved kneading-board E, for the uses and purposes shown and described.

2. The combination of the latticed cutter M, board L, and cleats *i*, for the uses and purposes shown and described.

3. The combined chest and bread-table herein described, consisting of the chest A, divided into compartments by the partition *a*, convex kneading-board E, cutter I, supported by the frame H, with the spring-rod F, and board L, having hinged to it the cutter M, as and for the purposes specified.

In testimony that I claim the foregoing improvements in combined flour-chest and bread-tables, as above described, I have hereunto set my hand and seal this 15th day of December, 1873.

JAMES M. JONES. [L. S.]

Witnesses:
 JAMES CHRISTIAN,
 JOHN N. NOYES.